(12) United States Patent
Liao

(10) Patent No.: US 12,052,380 B2
(45) Date of Patent: Jul. 30, 2024

(54) WIRELESS HEADSET

(71) Applicant: YEALINK (XIAMEN) NETWORK TECHNOLOGY CO., LTD., Fujian (CN)

(72) Inventor: Yun Liao, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 196 days.

(21) Appl. No.: 17/746,945

(22) Filed: May 17, 2022

(65) Prior Publication Data

US 2022/0377166 A1    Nov. 24, 2022

(30) Foreign Application Priority Data

May 18, 2021    (CN) .......................... 202110539183.4

(51) Int. Cl.
*H04M 1/60*      (2006.01)
*H04L 65/1073*   (2022.01)
*H04W 60/04*     (2009.01)

(52) U.S. Cl.
CPC ...... *H04M 1/6066* (2013.01); *H04L 65/1073* (2013.01); *H04W 60/04* (2013.01)

(58) Field of Classification Search
CPC ........... H04M 1/6066; H04M 1/72412; H04M 1/72415; H04M 2250/08; H04L 65/1073; H04L 65/1059; H04W 60/04; H04W 60/00; H04W 4/70; H04W 4/80; H04W 88/06; H04R 1/08; H04R 1/10
See application file for complete search history.

(56) References Cited

U.S. PATENT DOCUMENTS

| | | | | |
|---|---|---|---|---|
| 2011/0294423 A1* | 12/2011 | Lin | ...................... | H04M 1/6066 |
| | | | | 455/569.1 |
| 2016/0191093 A1* | 6/2016 | Larsen | ................ | H04M 1/6066 |
| | | | | 455/41.2 |
| 2018/0176766 A1* | 6/2018 | Bran | ...................... | H04W 12/06 |

FOREIGN PATENT DOCUMENTS

KR    20070032535 A    *   3/2007

* cited by examiner

*Primary Examiner* — Farid Seyedvosoghi

(57) ABSTRACT

A wireless headset includes a first wireless transceiver module, an account processing module, a session control module, a headset module, and a network communication processing module. The first wireless transceiver module is configured to implement data transmission between the wireless headset and a wireless base station via a first wireless communication protocol. The network communication processing module is configured to process a registration instruction sent by the account processing module to obtain a registration request, and send the registration request to the first wireless transceiver module. The first wireless transceiver module sends the registration request to the wireless base station. The network communication processing module is further configured to forward session control data sent by the session control module and media data of the headset module to the first wireless transceiver module.

9 Claims, 4 Drawing Sheets

WIRELESS HEADSET

CROSS-REFERENCE TO RELATED APPLICATIONS

The present application claims the benefit of Chinese Patent Application No. 202110539183.4 filed on May 18, 2021, the contents of which are hereby incorporated by reference.

TECHNICAL FIELD

The present disclosure relates to the technical field of headsets, and in particular, to a wireless headset.

BACKGROUND

Employees often need to do other things such as retrieving discussion materials and taking meeting minutes while participating in online meetings or phone calls. Therefore, headsets combined with microphones are increasingly frequently used in offices. In particular, wireless headsets are increasingly widely used. Headsets on the market today are used with other communication devices in offices, such as public switched telephone network (PSTN) telephones, personal computers, softphones, or digital cordless phones.

Existing wireless headsets need to rely on external devices for communication or interaction, with the following shortcomings: The existing wireless headsets are usually used as accessories of communication devices such as computers or Internet Protocol (IP) phones, and cannot implement communication anytime and anywhere due to a limited working distance. The following examples are used to describe the shortcomings: 1. As an accessory of a mobile terminal, such as a wired or wireless earphone connected to a mobile phone or a digital enhanced cordless telecommunications (DECT) handset, the headset can be normally used only when the handset is carried. For example, when it is inconvenient to hold a W56 handset for a call, the handset needs to be put in a pocket and the headset is worn for the call. Carrying is inconvenient. 2. The headset is connected to a computer, and communication software on the computer is used to make calls, answer calls, and hang up. The headset cannot be used alone or too far away from the computer. For example, a Bluetooth wireless headset and the computer can communicate with each other when they are within an appropriate range. 3. The headset is provided with a separate workbench and controlled by the workbench. The workbench needs to be connected to a communication device, such as a phone or a computer. Both the workbench and the computer can control the headset. The same problem exists: As an accessory, the headset needs to rely on the phone or computer to make a call, and the headset needs to be within an appropriate range from the workbench to work normally.

SUMMARY

The present disclosure provides a wireless headset to resolve the foregoing technical problem such that the headset does not rely on another communication device or software, that is, is not used as an accessory, but has its own account to implement active calls.

To resolve the foregoing technical problem, the present disclosure provides a wireless headset, including a first wireless transceiver module, an account processing module, a session control module, a headset module, and a network communication processing module.

The first wireless transceiver module is configured to implement data transmission between the wireless headset and a wireless base station via a first wireless communication protocol.

The network communication processing module is configured to process a registration instruction sent by the account processing module to obtain a registration request, and send the registration request to the first wireless transceiver module.

The first wireless transceiver module sends the registration request to the wireless base station to enable the wireless base station to register the wireless headset.

The network communication processing module is further configured to forward session control data sent by the session control module and media data of the headset module to the first wireless transceiver module to send the session control data and the media data to the wireless base station via the first wireless transceiver module.

Preferably, the session control data sent by the session control module may include session control data sent by a button module or a voice module on the wireless headset.

Preferably, the session control data sent by the session control module may further include session control data sent by an external control device.

Preferably, the wireless headset may further include a second wireless transceiver module, configured to implement data transmission between the wireless headset and the external control device via a second wireless communication protocol.

Preferably, the second wireless communication protocol is different from the first wireless communication protocol.

Preferably, the first wireless communication protocol and the second wireless communication protocol are each one of a DECT protocol, a wireless fidelity (Wi-Fi) protocol, a ZigBee protocol, a near field communication (NFC) protocol, and a Bluetooth protocol.

Preferably, the headset module includes an earpiece and a microphone. The earpiece is configured to play audio data, and the microphone is configured to acquire external audio data.

Preferably, the first wireless transceiver module receives paging information sent by the wireless base station via the first wireless communication protocol. The paging information is received by the wireless base station from an IP network by directly communicating with the IP network via a network interface.

Preferably, the external control device may include one or more of a mobile terminal, a DECT handset, a phone, and a computer.

Compared with the prior art, the present disclosure has the following beneficial effects:

The present disclosure provides a wireless headset, including a first wireless transceiver module, an account processing module, a session control module, a headset module, and a network communication processing module. The first wireless transceiver module is configured to implement data transmission between the wireless headset and a wireless base station via a first wireless communication protocol. The network communication processing module is further configured to process the registration instruction sent by the account processing module and forward the session control data sent by the session control module and the media data of the headset module. The headset in the present disclosure can implement a call function without relying on an external communication device or software. This may effectively increase the convenience of using the headset and improve user experience.

DETAILED DESCRIPTION

The technical solutions in the embodiments of the present disclosure are described below clearly and completely with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
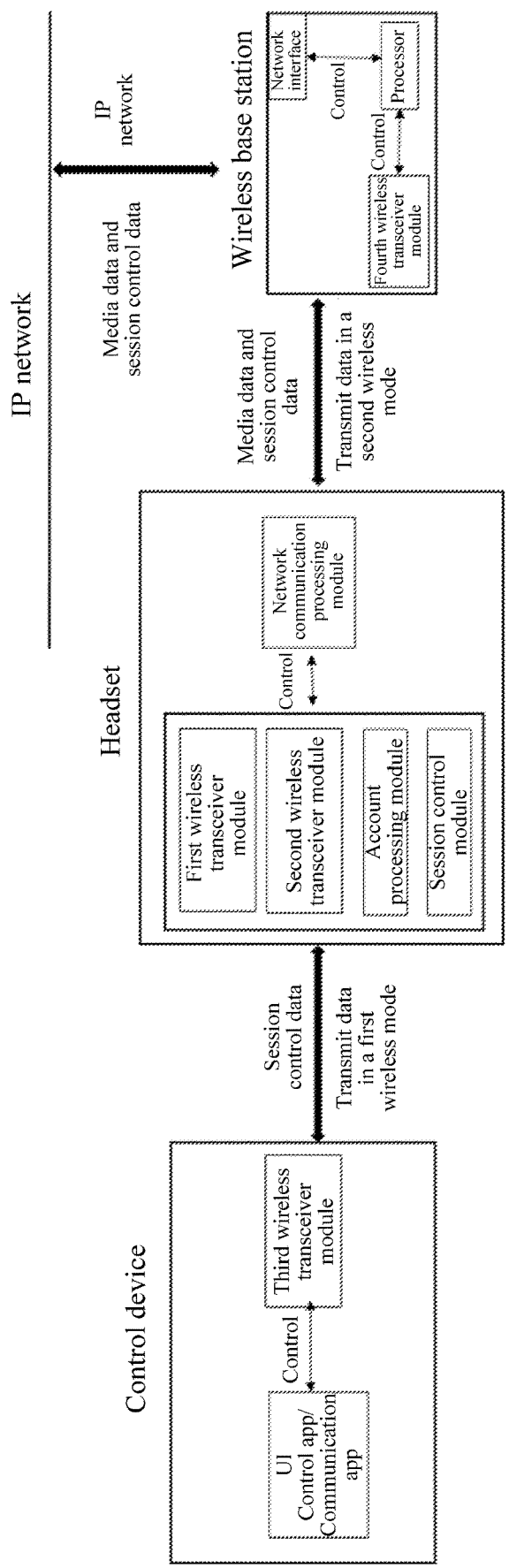
FIG. 1 is a schematic structural diagram of a wireless headset in a first mode according to an embodiment of the present disclosure.

Referring to FIG. 1, an embodiment of the present disclosure provides a wireless headset, including a first wireless transceiver module, an account processing module, a session control module, a headset module, and a network communication processing module.

The first wireless transceiver module is configured to implement data transmission between the wireless headset and a wireless base station via a first wireless communication protocol.

The network communication processing module is configured to process a registration instruction sent by the account processing module to obtain a registration request, and send the registration request to the first wireless transceiver module. The first wireless transceiver module sends the registration request to the wireless base station such that the wireless base station registers the wireless headset. The network communication processing module is further configured to forward session control data sent by the session control module and media data of the headset module to the first wireless transceiver module such that the first wireless transceiver module sends the session control data and the media data to the wireless base station.

It should be noted that the account processing module is configured to receive the registration instruction input by a user. After the network communication processing module of the headset processes the registration instruction, the first wireless transceiver module is controlled to send the registration request of the headset to the wireless base station. The wireless base station receives the registration request via a fourth wireless transceiver module, responds based on the received registration request, and returns registration success information to the wireless headset. In this way, the registration is completed. In this case, the first wireless transceiver module of the wireless headset establishes a wireless data transmission channel with the wireless base station via the first wireless communication protocol. The channel is used to transmit data information such as account information, the session control data, and the media data. After the registration, in response to a locate request initiated by the wireless headset, the wireless base station issues allocated account information and registration data of relevant settings to the wireless headset. The account processing module is further configured to receive the account information and the registration data of the relevant settings. The wireless headset synchronizes data such as an account at this stage to obtain the account. In this case, the headset has an active call function and can implement active calls without being used as an accessory of another communication device or software.

It should be noted that the headset module includes an earpiece and a microphone. The first wireless transceiver module performs data transmission with the base station via a wireless communication protocol such as a DECT protocol, a Wi-Fi protocol, a ZigBee protocol, an NFC protocol, or a Bluetooth protocol. Preferably, the DECT protocol may be used. The first wireless transceiver module of the headset performs registration via the DECT protocol and maintains requests, establishment, and data transmission of a channel of the wireless communication protocol. The wireless base station may be an IP DECT base station directly communicating with an IP network via a network interface. The IP DECT base station is configured to receive paging information from the IP network and send the paging information to a DECT wireless transceiver module of the headset via the DECT protocol. Time is synchronized among wireless transceiver modules of a plurality of base stations. Therefore, the headset can roam between different base stations. The network communication processing module includes a processor, configured to process the registration instruction sent by the account processing module and forward the session control data sent by the session control module and the media data of the headset module.

In this embodiment of the present disclosure, preferably, the session control data sent by the session control module may include session control data sent by a button module or a voice module on the wireless headset.

It should be noted that the session control data includes answering a call, making a call, sending and receiving text messages, multiway calling, call transfer, and the like. These session control data may be obtained through a button on the headset or voice recognition.

In this embodiment of the present disclosure, preferably, the session control data sent by the session control module may further include session control data sent by an external control device.

It should be noted that the foregoing session control data may also be obtained by the external control device. For example, a mobile phone is used as an accessory of the headset to provide an input interface for an operator to input the session control data through the mobile phone. If the session control data is call request data, a specific process is as follows: The user inputs a phone number of a callee on the input interface and taps a call button. The mobile phone used as the accessory sends a call request to the wireless headset. The wireless headset receives the call request, initiates a call through the session control module of the headset, and connects to the callee through the wireless base station. In this case, calling is performed by the account of the wireless headset. The mobile phone is used only as the accessory of the headset and the input interface.

In this embodiment of the present disclosure, preferably, the wireless headset may further include a second wireless transceiver module, configured to implement data transmission between the wireless headset and the external control device via a second wireless communication protocol. The second wireless communication protocol may be the DECT protocol, the Wi-Fi protocol, the ZigBee protocol, the NFC protocol, the Bluetooth protocol, or the like. Preferably, to prevent mutual interference of signals, the second wireless transceiver module and the first wireless transceiver module use different wireless communication protocols. For example, the first wireless transceiver module may be a DECT wireless module, and the second wireless transceiver module may be a Bluetooth module. In this case, the control device includes a third wireless transceiver module, such as a Bluetooth module in a mobile phone, matching the second wireless transceiver module of the wireless headset.

In this embodiment of the present disclosure, preferably, the external control device may include one or more of a mobile terminal, a DECT handset, a phone, and a computer.

Based on the foregoing solution, to facilitate a better understanding of the wireless headset provided in the embodiments of the present disclosure, the following provides detailed descriptions.

Figure 3:
FIG. 3 is a schematic structural diagram of an overall system of a wireless headset according to an embodiment of the present disclosure.

An embodiment of the present disclosure provides a dual-mode headset that does not rely on another communication device and can be used alone. FIG. 3 is a schematic structural diagram of an overall system of the headset.

The headset in this embodiment has two wireless transmission functions. In addition, after the headset is registered to a wireless base station and obtains an account, the headset has an active call function and may not be used as an accessory of another communication device or software.

Referring to FIG. 1, in a first mode:

A control app is installed on a mobile phone. Through interaction between the control app and the headset, a user can input an instruction by a touch display and a keyboard of the mobile phone. The control app simultaneously synchronizes account data and contact information to the mobile phone. The user can operate on the control app to implement various functions, such as receiving and sending text messages, making a call, multiway calling, and call transfer, through the headset.

Dialing is used as an example. After the control app receives a dialing instruction from the user, a third wireless transceiver module, such as a Bluetooth module, of the mobile phone sends session control data to the matched wireless headset (Bluetooth or DECT headset) through Bluetooth. A second wireless transceiver module, such as a Bluetooth wireless module, of the wireless headset receives the session control data. In this case, a processor of the wireless headset controls a session control module to send the received session control data to a wireless base station, such as an IP DECT base station, through the first wireless transceiver module, such as a DECT wireless transceiver module. The session control data is finally sent to an IP network through a network interface to implement a call with a remote device. After the call is established, media data received by a microphone of the headset is sent to the wireless base station through the first wireless transceiver module and is finally sent to the IP network through the network interface to implement voice transmission with the remote device.

As an accessory of the headset, the mobile phone provides an input interface for the operator, and the headset implements the call. Conversely, the user can answer a call from the remote device through the control app on the mobile phone. Preferably, the headset may have some buttons, such as call, mute, hold, and attendance buttons. If the user leaves the position of the mobile phone while wearing the headset, when there is an incoming call, the user can directly answer the call through the call button on the headset without using the mobile phone to control the call answering. When there are a plurality of incoming calls simultaneously, the user can mix the plurality of calls through the attendance button.

Because the wireless headset is directly connected to the wireless base station, and time is synchronized among wireless transceiver modules of a plurality of wireless base stations, the wireless headset can roam between different base stations. This greatly extends a use range of the wireless headset.

It should be noted that because the headset has its own account, calls are made and answered through the headset. For an existing regular Bluetooth headset used as an accessory of a communication device (such as a mobile phone), only media data is transmitted through Bluetooth, and calls are made and answered through the communication device such as the mobile phone. Because there are buttons on the headset in this embodiment of the present disclosure, the headset can be used alone to implement simple functions such as answering calls, hanging up, attending meetings, and holding calls without the control app. In addition, because the headset can roam between different IP DECT base stations, the headset can be used in an office provided with a plurality of IP DECT base stations rather than a small range (for example, a range of 10 meters for a Bluetooth connection).

Figure 2:
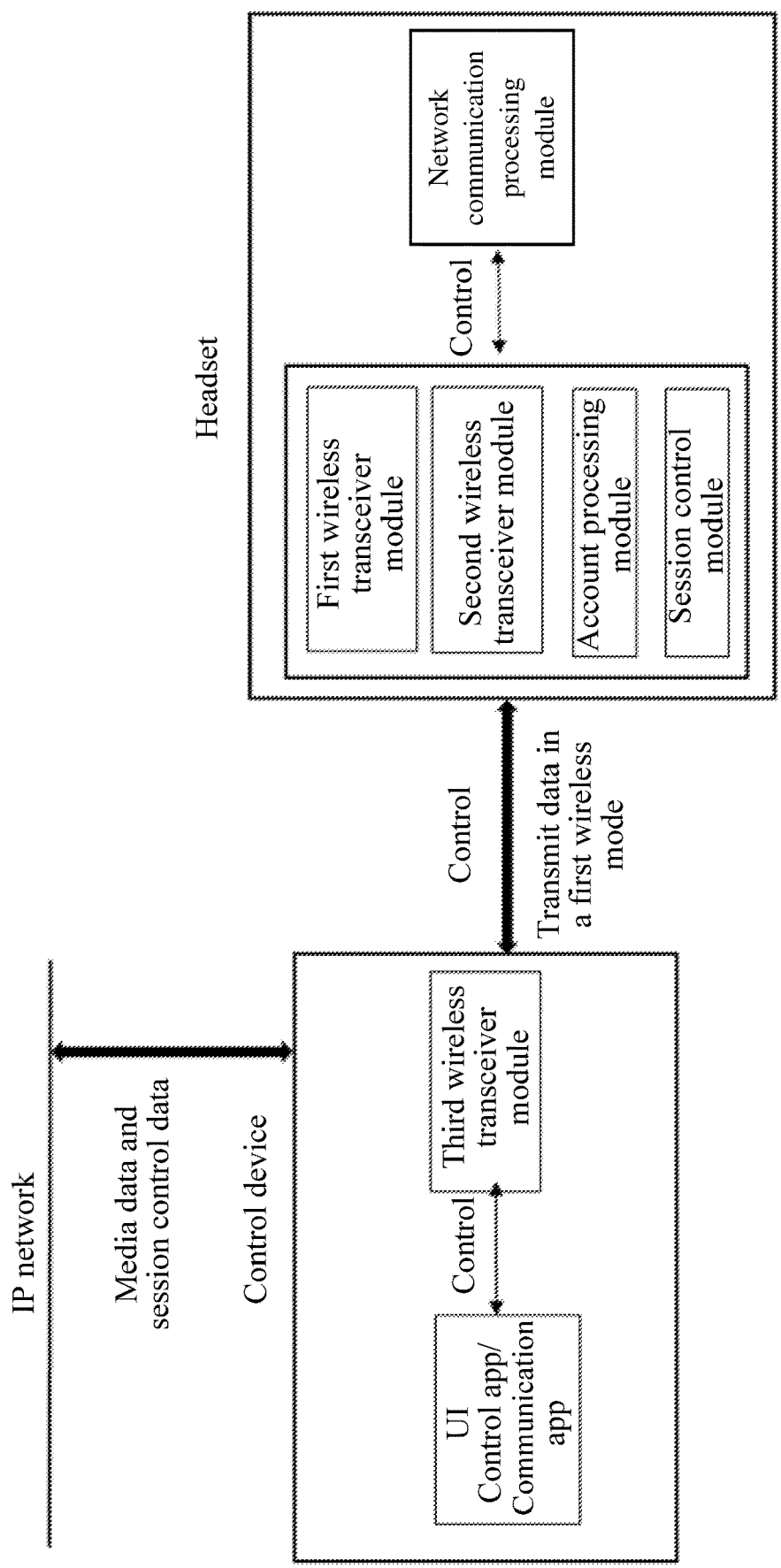
FIG. 2 is a schematic structural diagram of a wireless headset in a second mode according to an embodiment of the present disclosure.

Referring to FIG. 2, in a second mode:

The headset can also be used as a regular headset to transmit media data with a mobile phone through a Bluetooth module. A communication app such as Teams or Ume is installed on the mobile phone. Calls can also be answered on the headset. However, in this case, the call is implemented through the mobile phone or the communication app installed on the mobile phone, and the headset serves as a peripheral of the mobile phone.

Figure 4:
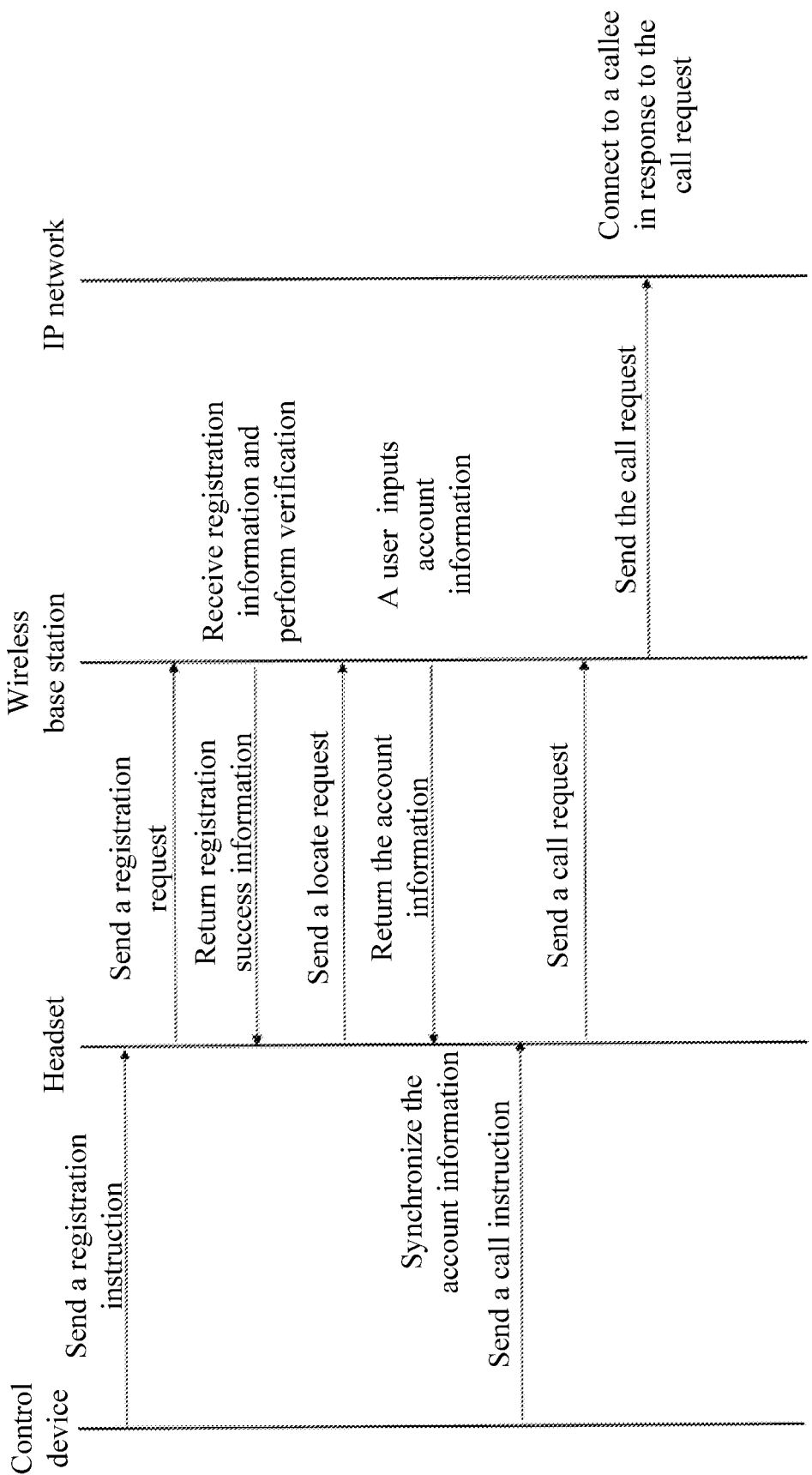
FIG. 4 is a working principle diagram of account registration and calling for a wireless headset according to an embodiment of the present disclosure.

FIG. 4 is a working principle diagram of account registration and calling for a wireless headset according to an embodiment of the present disclosure.

The following describes an account registration process and an active call process of the wireless headset.

The process in which the wireless headset is registered and obtains an account is as follows: A user inputs a registration instruction on a control device. The control device sends the registration instruction to a wireless headset via a third wireless transceiver module, such as a Bluetooth module of a mobile phone. The wireless headset receives the registration instruction via a second wireless transceiver module matching the third wireless transceiver module. After receiving the registration instruction, an account processing module of the headset sends a registration request to a wireless base station via a first wireless transceiver module, such as a DECT module. Before the registration request is sent, the wireless headset enables a registration mode and searches for the wireless base station. The wireless base station enables the registration mode to be found by the wireless headset. After finding a signal of the base station, the wireless headset locks the base station and initiates the registration request. The wireless headset sends the registration request. The registration request contains registration information, such as authentication and encryption information. The wireless base station verifies the wireless headset based on the registration information. If the verification is passed, an OK response is made. This way, the registration is completed. After the registration, the wireless headset initiates a locate request. The user inputs account information on an account management page of the base station. The wireless base station issues registration data, such as allocated account information, to the wireless headset based on the account information input by the user. The wireless headset receives the registration data, such as the account information, via the first wireless transceiver module. The account processing module synchronizes the registration data, such as the account information, to obtain the account of the wireless headset. Then, the wireless headset can make an active call by the account.

When the wireless headset makes a call, the user inputs a number to be dialed on the control device such as a mobile phone and taps a call button. The control device sends a call instruction to the wireless headset via the third wireless transceiver module. The second wireless transceiver module of the wireless headset receives the call instruction. The call control module initiates a call request and sends the call request to the wireless base station via the first wireless transceiver module. The wireless base station sends the call request of the headset to an IP network via a network interface. Finally, the IP network responds to the call request and connects to the callee.

In another embodiment, the wireless headset includes a processor. The processor is configured to execute the foregoing program modules stored in a memory, including the first wireless transceiver module, the second wireless transceiver module, the account processing module, a session control module, and a network communication processing module.

Compared with the prior art, the embodiments of the present disclosure have the following beneficial effects:

The embodiments of the present disclosure provide the wireless headset that does not rely on an external communication device or software and can be used alone. The headset does not rely on a mobile phone or a computer for dialing and can be used independently like a DECT handset. In addition, the headset can be used for DECT roaming, that is, used to roam when the user walks around in an office provided with DECT base stations. This may effectively increase the convenience of using the headset and improve user experience.

The descriptions above are preferred implementations of the present disclosure. It should be noted that for a person of ordinary skill in the art, various improvements and modifications can be made without departing from the principles of the present disclosure. These improvements and modifications should also be regarded as falling into the protection scope of the present disclosure.

The invention claimed is:

1. A wireless headset, comprising a first wireless transceiver module, an account processing module, a session control module, a headset module, and a network communication processing module; wherein
the first wireless transceiver module is configured to implement data transmission between the wireless headset and a wireless base station via a first wireless communication protocol;
the network communication processing module is configured to process a registration instruction sent by the account processing module to obtain a registration request, and send the registration request to the first wireless transceiver module;
the first wireless transceiver module is configured to sends the registration request to the wireless base station to enable the wireless base station to register the wireless headset;
the account processing module is configured to initiate a locate request to the wireless base station after registering the wireless headset with the wireless base station, and receive account information and registration data of relevant settings sent by the wireless base station in response to the locate request, to enable the wireless headset to have an active call function; and
the network communication processing module is further configured to forward session control data sent by the session control module and media data of the headset module to the first wireless transceiver module to send the session control data and the media data to the wireless base station via the first wireless transceiver module.

2. The wireless headset according to claim 1, wherein the session control data sent by the session control module comprises session control data sent by a button module or a voice module on the wireless headset.

3. The wireless headset according to claim 2, wherein the session control data sent by the session control module further comprises session control data sent by an external control device; and the session control data sent by the external control device comprises call request data configured to initiate a call through the session control module.

4. The wireless headset according to claim 3, further comprising a second wireless transceiver module, configured to implement data transmission between the wireless headset and the external control device via a second wireless communication protocol.

5. The wireless headset according to claim 4, wherein the second wireless communication protocol is different from the first wireless communication protocol.

6. The wireless headset according to claim 4, wherein the first wireless communication protocol and the second wireless communication protocol are each one of a digital enhanced cordless telecommunications (DECT) protocol, a wireless fidelity (Wi-Fi) protocol, a ZigBee protocol, a near field communication (NFC) protocol, and a Bluetooth protocol.

7. The wireless headset according to claim 3, wherein the external control device comprises one or more of a mobile terminal, a DECT handset, a phone, and a computer.

8. The wireless headset according to claim 1, wherein the headset module comprises an earpiece and a microphone, the earpiece is configured to play audio data, and the microphone is configured to acquire external audio data.

9. The wireless headset according to claim 1, wherein the first wireless transceiver module receives paging information sent by the wireless base station via the first wireless communication protocol; and the paging information is received by the wireless base station from an Internet Protocol (IP) network by directly communicating with the IP network via a network interface.

* * * * *